Sept. 29, 1925.

R. P. BROWN

FURNACE REGULATING SYSTEM

Filed Aug. 17, 1921

1,555,549

3 Sheets-Sheet 1

WITNESS
F. J. Hartman.

INVENTOR
Richard P. Brown.

BY
Robert M. Barr.
ATTORNEY

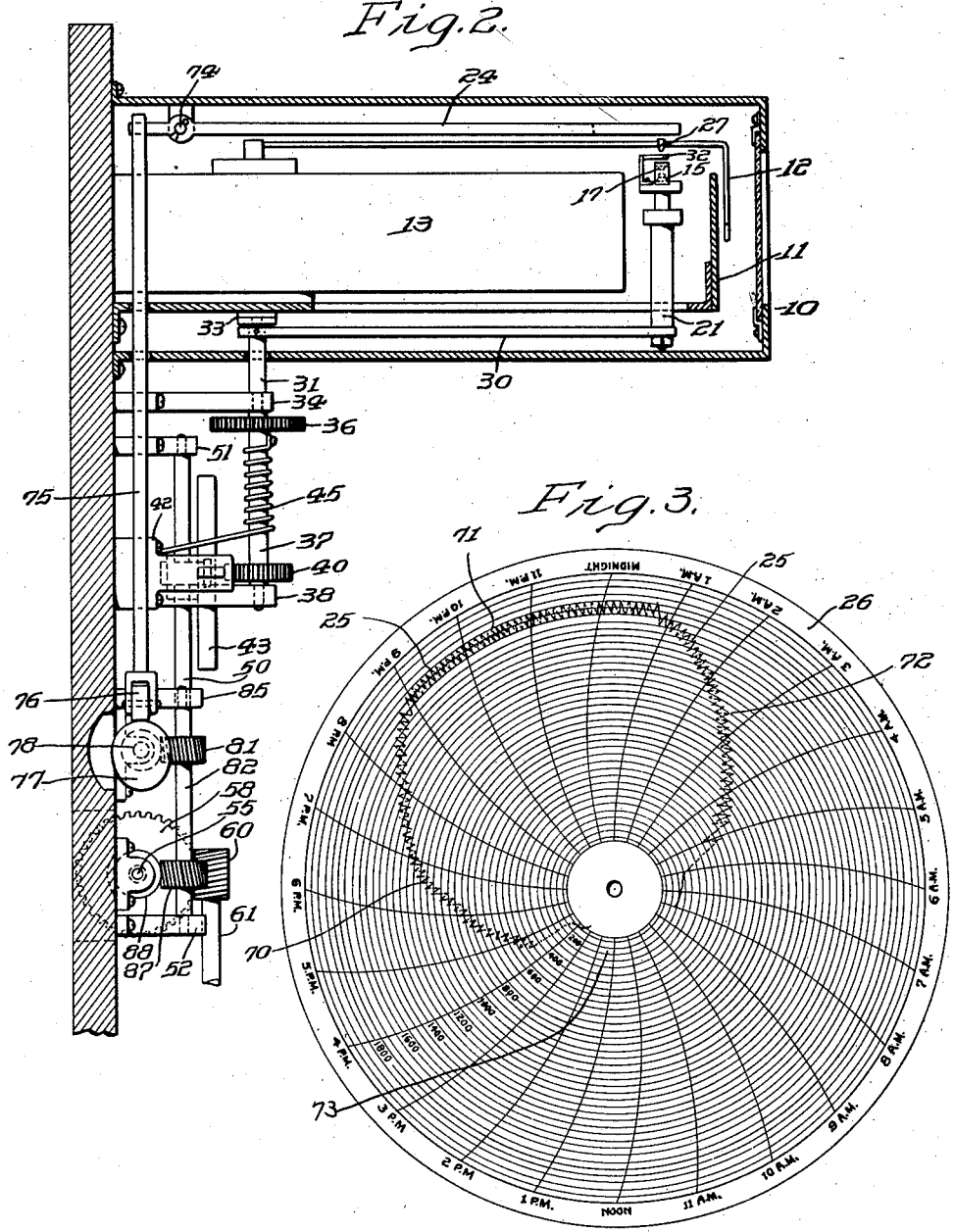

Sept. 29, 1925.

R. P. BROWN 1,555,549

FURNACE REGULATING SYSTEM

Filed Aug. 17, 1921

3 Sheets-Sheet 3

INVENTOR

Richard P. Brown.

WITNESS

F. J. Hartman.

BY

Robert M. Barr.

ATTORNEY

Patented Sept. 29, 1925.

1,555,549

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

FURNACE-REGULATING SYSTEM.

Application filed August 17, 1921. Serial No. 492,938.

*To all whom it may concern:*

Be it known that I, RICHARD P. BROWN, a citizen of the United States, and a resident of Philadelphia, county of Philadelphia, State of Pennsylvania, have invented certain new and useful Improvements in Furnace-Regulating Systems, of which the following is a specification.

Some of the objects of the present invention are to provide means for regulating or controlling a heating medium in accordance with a predetermined characteristic temperature curve; to provide means for causing a heating medium to operate in such a manner as to conform to a predetermined heating cycle; to provide means for automatically varying the heating cycle of a heating medium in a predetermined manner; to provide an electrical instrument arranged to cause a heating medium to maintain a constant temperature for a certain time interval; to provide an electrical instrument arranged to increase the temperature of a heating medium to a selected maximum and then maintain such maximum temperature for a certain time interval; to provide an electrical instrument arranged to gradually decrease the temperature of a heating medium in a predetermined manner; to provide means operating in conjunction with a movable element of an electrical instrument whereby a circuit corresponding to a certain temperature is caused to function; to provide means operating in conjunction with an electrical instrument for causing a controllable device to function in accordance with a predetermined characteristic condition or quantity curve; and to provide other improvements as will hereinafter appear.

Figure 1:
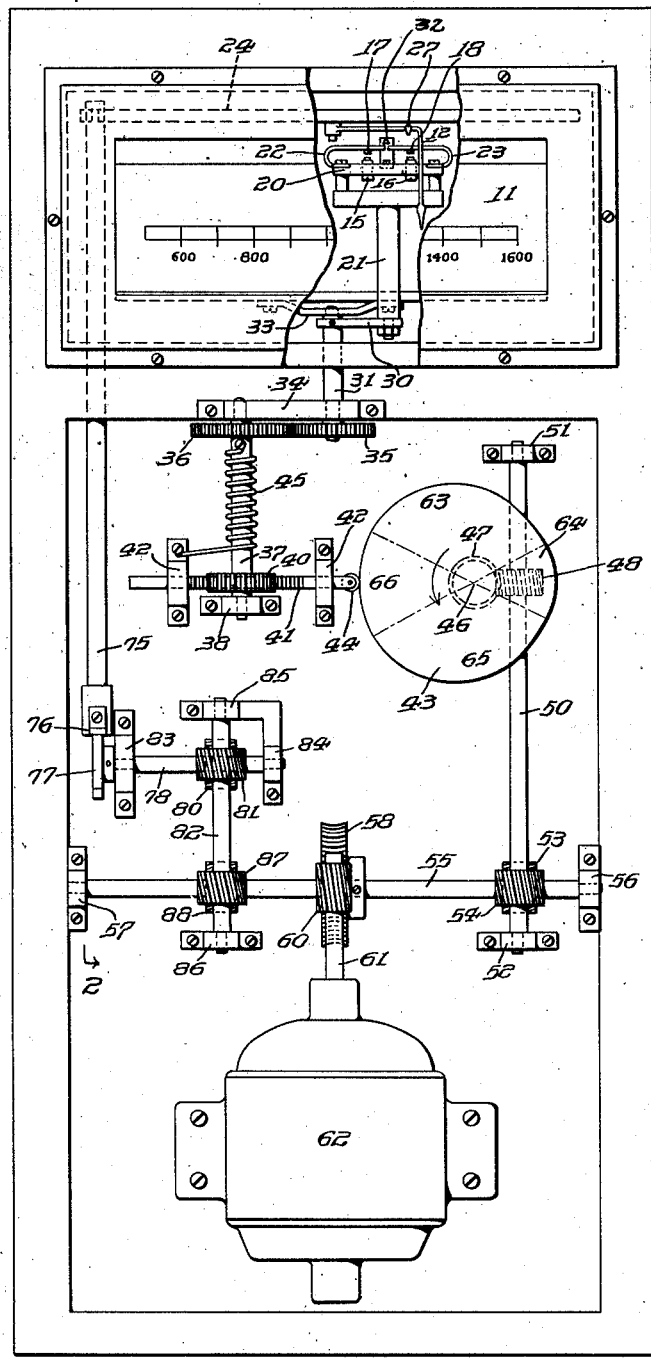
Figure 4:
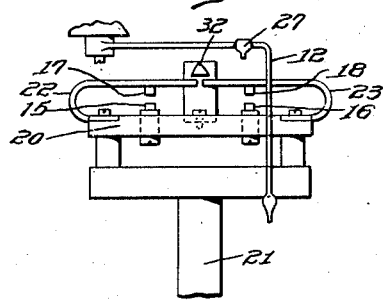
Figure 5:
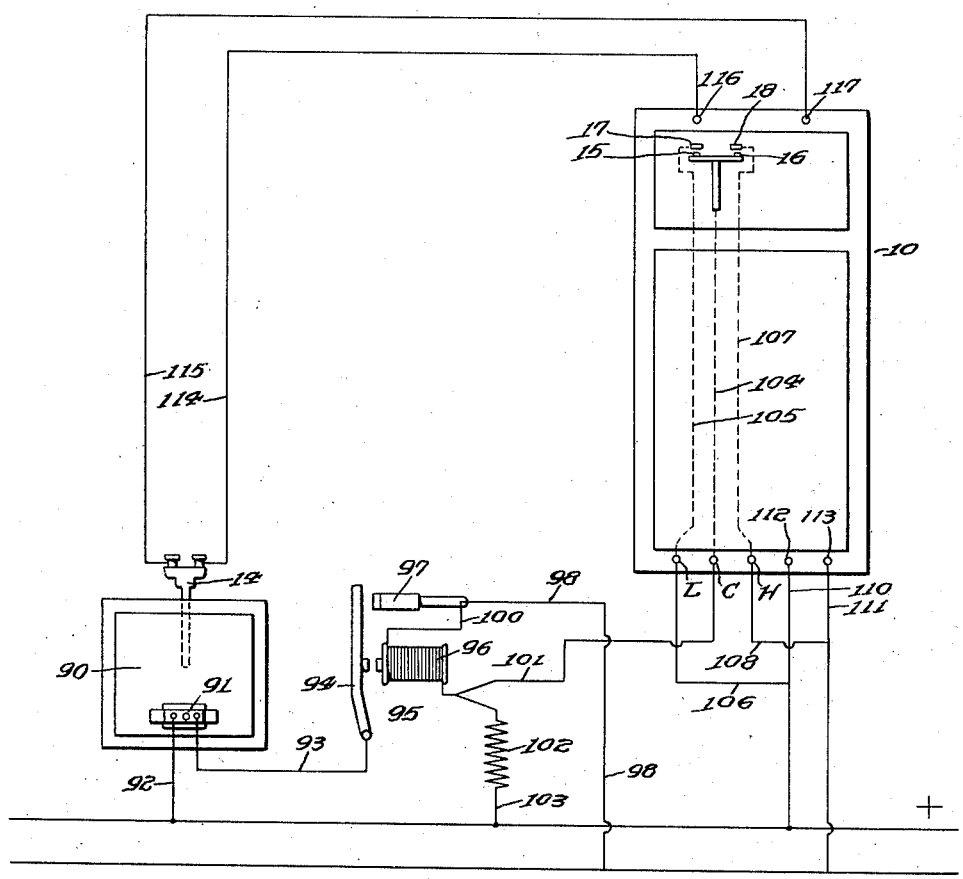

In the accompanying drawings Fig. 1 represents a front elevation of a furnace control instrument embodying one form of the present invention, certain parts being broken away for clear illustration; Fig. 2 represents a section on line 2—2 of Fig. 1; Fig. 3 represents a chart showing a selected characteristic temperature curve of a furnace controlled by the instrument of the present invention; Fig. 4 represents an enlarged detail of the contact mechanism, and Fig. 5 represents a diagram of one arrangement of electrical furnace control.

Referring to the drawings one form of the present invention comprises an electrical instrument 10 of any standard form for temperature recording or indicating purposes, the latter being here shown for purposes of illustration, having a scale 11, a pivoted pointer or index 12 arranged to be operated by galvanometer 13 or any other sensitive element controlled by a temperature responsive device, such as a thermocouple 14. The pointer 12 is arranged to travel across the face of the scale 11 under the influence of the sensitive element 13, in a well known manner, as changes occur in the temperature of the furnace or other heating medium where the temperature responsive device 14 is located.

For the purpose of controlling or regulating the temperature of the furnace with which the instrument 10 is connected, it is preferable to provide an electrically operated device or devices, the operation of which is selectively determined by two sets of contacts 15 and 16 and contactors 17 and 18 carried by a plate 20 of insulating material mounted upon a rigid movable post 21. The contacts 15 and 16 are fixed to the plate 20 in juxtaposed relation respectively to the contactors 17 and 18 but normally spaced therefrom so that any circuits controlled thereby are normally open and inoperative. The contactors 17 and 18 are insulated from each other and carried respectively by arms 22 and 23 of spring material in order to return them to normal position after a contacting operation.

As a means for selectively actuating the aforesaid contactors 17 and 18 the pointer 12, a depressor bar 24 and means for varying the position of the post 21 in accordance with a predetermined time-temperature characteristic curve, such as shown at 25 upon reproduced chart 26, are provided. The pointer 12 is provided with a lug 27 or other means arranged to be brought into register with the respective contactors 17 and 18 to cause one or the other of said contactors to be actuated when the pointer 12 is moved under the periodic impact of the depressor bar 24.

In order to vary the position of the post 21 while maintaining the contactors 17 and 18 respectively in alinement with the arc of travel of the pointer lug 27, the post 21 is rigidly mounted upon an arm 30 fixed to a shaft 31 which is journalled coaxially with respect to the pointer 12. The arrangement is such that the radius of travel of the contactors 17 and 18 is the same as the radius of travel of the lug 27, and the respective parts move in parallel planes, that of the contactors 17 and 18 being preferably below the other.

In case the post 21 should assume a position where the lug 27 would probably cause both contactors 17 and 18 to function, a knife edge element 32 is fixed to the plate 20 between and above both of the contactors so that the operating stroke of the pointer 12 will cause the lug 27 to engage the knife edge element 32 and thereby deflect the pointer 12 to the required side of the knife edge and thus engage and operate only the intended contactor.

For the purpose of imparting a predetermined motion to the post 21, the shaft 31, which is journalled in suitable fixed brackets 33 and 34, has a gear 35 keyed thereon which is in mesh with a gear 36 keyed or otherwise made fast to a driven spindle 37. One end of the spindle 37 may be journalled in the bracket 34 and its other end in a second bracket 38 fixed to the instrument casing. In the present construction the spindle 37 is arranged to be rotated in one direction by a gear 40 fast to the spindle 37 and in mesh with a rack bar 41 mounted for reciprocating motion in guide brackets 42 and receiving its motion from a rotatable cam 43 contacting with a roller 44 carried by the rack bar 41. The spindle 37 is reversely rotated and the rack bar roller 44 held in contact with the cam 43 by a coil spring 45, one end of which is fast to a fixed part, such as one of the brackets 42, and the other end of which is fast to the spindle 45.

The cam 43 is preferably keyed to a shaft 46 driven by worm gears 47 and 48 from a shaft 50 journalled in bearings 51 and 52, motion being transmitted by worm gears 53 and 54 from a counter-shaft 55. The counter-shaft 55 is journalled in bearings 56 and 57 and has a worm gear 58 keyed thereon in mesh with a worm gear 60 which is fast to a driving shaft 61 of a motor 62 or any other suitable source of power. The motor speed and gear ratios are so proportioned as to preferably rotate the cam 43 at a uniform predetermined constant speed.

For causing the contact carrying post 21 to travel in either direction according to requirements for a predetermined time interval, the cam 43 has its surface divided into a plurality of segments, here shown as four, 63, 64, 65 and 66, the contour of each of which corresponds to a portion of the heating cycle for the particular furnace operation required. The contour of the surface of the cam 43 is designed so that the position of the contact post 21 will be such as to control or regulate the furnace temperature in accordance with a predetermined characteristic temperature curve, such for example as that shown on the chart 26, wherein the curve 25 indicates; by the portion 70 an increase in furnace temperature from 0° to 1350° in approximately five hours; by the portion 71 a constant furnace temperature of 1350° for approximately four hours; by the portion 72 a gradually decreasing furnace temperature or cooling off period of approximately seven hours; and the portion 73 atmospheric temperature when the furnace is shut down for approximately eight hours.

It will be understood the time periods, as well as the desired temperature ranges throughout the heating cycle, can be varied as desired by substituting other shaped cams for that shown here as illustrative of one form of the invention.

As a means for periodically actuating the depressor bar 24, it is connected at one side of its fulcrum 74 to a reciprocable rod 75, which carries at the lower end a roller 76 arranged to be held by gravity in contact with the operating face of a cam 77. Rotary motion is transmitted to the cam 77 by a shaft 78 driven by worm gears 80 and 81 from a driven shaft 82. The shaft 78 is journalled in suitable fixed brackets 85 and 86. The shaft 82 is driven continuously, through worm gears 87 and 88, from the countershaft 55.

Referring to Fig. 5 of the drawings, a diagram of the furnace and the adjuncts of the control instrument is shown, including one form of electrically operated devices wherein a furnace regulating unit is embodied. A furnace 90 of the electrically heated type has been selected for purposes of illustration and has a heating unit 91 of standard form, one terminal of which is connected by a conductor 92 to one side of the service line or other source of current, while the other terminal thereof is connected by a conductor 93 to a movable circuit closer arm 94 of an automatic control switch 95. The arm 94 is pivotally mounted and arranged to move in one direction by gravity and in the other direction by the action of a relay coil 96. In the present construction the heating unit circuit is broken when gravity acts to move the arm 94, and when the arm 94 is moved by the energizing of the coil 96 it closes the heating circuit by engaging a contact 97. This contact 97 is connected by a conductor 98 with the opposite side of the service line with respect to the conductor 92.

For automatically controlling the energizing of the coil 96 one end of its winding is connected by a conductor 100 to the conductor 98 while the other end of its winding has two paths, one by way of a conductor 101 to a binding post C upon the instrument case, and the other by way of a resistor 102 and conductor 103 to the opposite side of the service line from the conductor 98. The binding post C is connected by a conductor 104 forming the common return for the contacts 15 and 16. The contactor 17 of the low temperature control circuit is connected by a conductor 105 to a binding post L which is connected by a conductor 106 to the positive side of the service line. The contactor 18 of the high temperature control circuit is connected by a conductor 107 to a binding post H which is connected by a conductor 108 to the negative side of the service line. Supplemental conductors 110 and 111 lead respectively from the service line to binding posts 112 and 113 for the pyrometer operating mechanism as will be understood. The thermo-couple 14 is connected by conductors 114 and 115 to respective binding posts 116 and 117 for the operation of the sensitive element 13.

In the operation of the switch 95 the line current flows through the resistor 102 and through the coil 96 but with the resistor 102 in circuit the magnetic pull of the coil 96 is not sufficient to draw the closer arm 94 to its closed position, though if the closer arm 94 is in its closed position the pull is sufficient to so hold it.

When the instrument is in operation and the temperature is below the predetermined temperature so that the depressor bar 24 causes the contact 15 and contactor 17 to close, a circuit is closed by way of conductor 105, binding post L, conductor 106, across the service line, conductors 98 and 100, through coil 96, conductor 101 to binding post C, and conductor 104 to contact 15. This short circuits the resistor 102 so that the full strength of the coil 96 pulls the closer arm 94 to closed position, thereby directing the current by way of contacts 97 and causing the heating unit 91 to operate to heat the furnace. When the depressor bar 24 causes the contacts 15 and 17 to break the short circuit, the arm 94 is still held in closed position, as heretofore explained, and the heating of the furnace continues. Normally, of course, for starting and heating up the furnace, the closer arm 94 is in its closed position and so remains until the temperature has reached the desired point.

When the temperature rises above the predetermined temperature the operation of the depressor bar 24 causes the contact 16 and contactor 18 to close the circuit of conductor 107, binding post H, conductor 108, across service line, conductor 103, resistor 102, conductor 101, binding post C, return conductor 104 to contact 16. This short circuits the coil 96 and the weight of the closer arm 94 returns it to inoperative position with the main circuit broken at contact 97. The heating unit 91 thereupon ceases to heat the furnace and the temperature falls until such time as the low temperature circuit again operates and causes the heating unit 91 to again function.

The opening and closing of the foregoing circuits is controlled by the position of the contact post 21 with respect to the pointer or index 12, or any other movable element suitable for the purpose, and the position of the post 21 is determined by the contour of the cam 43. In the position of the cam 43 in Fig. 1 the cam segment 66 is in position corresponding to the constant zero or low temperature portion 73 of the selected temperature characteristic curve 26 and the circuit to the furnace heating unit is broken. As the cam 43 rotates counter-clockwise, the segment 63 reaches the roller 44 so that the cam contour permits the bar 41 to move to the right (as seen in Fig. 1) under the influence of the spring 45 and as a result the contact post 21 also swings to the right and thereby maintains the low temperature contactor 17 in position to be engaged by the pointer lug 27 when actuated by the depressor bar 24. The circuit of the heating unit 91 is closed so that the temperature of the furnace gradually increases. In case the temperature rises too fast the pointer 12 will advance until it is above the high temperature contactor 18 whereupon the action of the depressor bar 24 closes the circuit which short circuits the coil 96 and the heating unit circuit thereupon becomes temporarily interrupted. As the temperature falls the pointer 12 returns to a position above the low temperature contactor 17 and the heating unit is again energized to resume heating.

When the cam segment 64 reaches the roller 44 the rack bar 41 and its adjuncts, including the contact post 21, are held stationary for the predetermined interval and the furnace is consequently maintained at a constant temperature for that period.

When the cooling off period is reached the cam segment 65 picks up the roller 44 and thereby shifts the bar 41 to the left (as seen in Fig. 1), thereby causing the contact post 21 to gradually swing to the left so that the high temperature contactor 18 more closely follows the movement of the pointer 12 and the heating unit is deenergized sufficiently during the cooling interval to cause the temperature to gradually fall in the required manner. Should the temperature drop faster than the movement of the contact post 21, the pointer 12 will move over the low temperature contactor 17 and cause the heating unit to resume heating operation until the temperature has been restored to that called for by the characteristic curve at that position of the cam 43.

From the foregoing it will be apparent that a complete unitary electrical instrument has been devised arranged to operate with substantially all types of furnaces for controlling the temperature thereof in accordance with predetermined conditions or with a selected heating cycle. While the system has been here described in connection with the regulation of a furnace, it is to be understood that the invention is not so specifically limited but has a broad field of use for controlling electrical, chemical, and mechanical conditions, either as to temperature or other quantities including variations or changes therein. For example the system may be employed as a control for a solenoid operated valve such as disclosed in Patent #1,384,443 dated July 12, 1921, or any other mechanisms whereby liquids or gases are regulated, proportioned or otherwise controlled in a desired predetermined manner. Also it will be understood that the term "furnace" is used entirely in a generic sense and is to be considered as any kind or type of heating device wherein a temperature is to be regulated in accordance with a definite heating cycle.

While but one form of cam 43 has been shown and described, various other forms of cams are contemplated in the invention, as obviously any change or variation in the predetermined heating cycle necessitates a cam corresponding to the changed condition, and in consequence the system has a wide range of characteristic control curves. Thus, by interchanging one cam for another it is possible to obtain substantially any desired commercial cycle of operations with regard to time and rate.

Having thus described my invention, I claim:

1. In a control system, the combination of a furnace, heating means therefor, an electrical instrument controlled by the temperature of said furnace and comprising a pointer and means for controlling said heating means comprising two electric circuits having movable terminals separate from but dependent upon said pointer means for causing said pointer to selectively actuate said terminals to close said circuits one at a time, and means for automatically moving said terminals in a predetermined manner to thereby vary the furnace temperature in a manner dependent upon such movement of said terminals.

2. In a control system the combination of a furnace, heating means therefor, a temperature responsive device subject to the temperature of said furnace, an electrical instrument controlled by said responsive device and provided with a pointer, means including a plurality of electric circuits for controlling said heating means, a plurality of contact terminals separate from but dependent upon said pointer for selectively controlling said circuits, means to vary the position of said contact mechanism in accordance with a predetermined characteristic time-temperature curve, and means for actuating said pointer to cause the selective operation of said contact terminals whereby said heating control means functions to produce a temperature conforming to said characteristic curve.

3. In a control system the combination of a furnace, heating means therefor, a temperature responsive device subject to the temperature of said furnace, an electrical instrument controlled by said responsive device and having a pointer, means including a plurality of electric circuits for controlling said heating means, movable contact terminals separate from but dependent upon said pointer for selectively controlling said circuits, means including a rotatable cam to vary the position of said contact terminals in accordance with a predetermined characteristic time-temperature curve, and means for actuating said pointer to cause the selective operation of said contact terminals whereby said heating control means functions to produce a temperature conforming to said characteristic curve.

4. In a control system the combination of a furnace, heating means therefor, a thermo-couple subject to the temperature of said furnace, an electrical instrument controlled by said thermo-couple, means including a plurality of electric circuits for controlling said heating means, a movable contact mechanism arranged to travel across one side of said electrical instrument for closing said circuits, means to vary the position of said contact mechanism in accordance with a predetermined characteristic time-temperature curve, and means including a pointer actuated by said electrical instrument for selectively operating said contact mechanism whereby said heating control means functions to produce a temperature conforming to said characteristic curve.

5. In a control system the combination of a furnace, heating means therefor, a thermo-couple subject to the temperature of said furnace, an electrical instrument controlled by said thermo-couple and provided with a pointer, means including a plurality of electric circuits for controlling said heating means, a pair of movable contacts for each of said electric circuits, means including a rotatable cam to vary the position of said contact mechanism in accordance with a predetermined time-temperature curve, and means for actuating said pointer to cause the selective operation of said contact terminals whereby said heating control means functions to produce a temperature conforming to said characteristic curve.

6. In a furnace regulating system, the combination of an electrical instrument for indicating furnace temperature, a temperature responsive device for actuating said instrument, a control device, an electrical circuit for causing said controlled device to function, said circuit including two terminals, a contact plate supporting said terminals in insulated relation and normally out of contact, means including a rotatable cam of predetermined contour for causing said plate to travel in a predetermined manner, and means controlled by said electrical instrument for bringing said terminals into contact under certain temperature conditions to close said circuit to actuate said controlled device.

7. In a furnace regulating system, the combination of a heating means, a temperature responsive device subject to the temperature of said heating means, an electrical instrument controlled by said responsive device, means including a plurality of electric circuits for controlling said heating means, a selecting mechanism for said circuits arranged to be operated by said instrument and including circuit closing elements for each circuit, a movable support for said circuit closing elements, a cam having a contour corresponding to a predetermined time-temperature curve, and means cooperating with said cam for causing said support to travel in accordance with said cam contour.

Signed at Philadelphia, county of Philadelphia, State of Pennsylvania, this 15th day of August, 1921.

RICHARD P. BROWN.